United States Patent [19]

Uchiyama

[11] Patent Number: 5,351,536
[45] Date of Patent: Oct. 4, 1994

[54] AIR FLOW RATE DETECTOR
[75] Inventor: Kaoru Uchiyama, Ibaraki, Japan
[73] Assignee: Hitachi, Ltd., Tokyo, Japan
[21] Appl. No.: 46,916
[22] Filed: Apr. 14, 1993

Related U.S. Application Data

[63] Continuation of Ser. No. 683,619, Apr. 11, 1991, abandoned.

[30] Foreign Application Priority Data

Apr. 18, 1990 [JP] Japan .................. 2-100332

[51] Int. Cl.⁵ .............................. G01F 1/68
[52] U.S. Cl. ............................... 73/204.26
[58] Field of Search .................. 73/204.25, 204.26

[56] References Cited

U.S. PATENT DOCUMENTS

| 3,900,819 | 8/1975 | Djorup | 73/204.26 |
|---|---|---|---|
| 4,399,697 | 8/1983 | Kohama et al. | 73/204.26 |
| 4,449,402 | 5/1984 | Eiermann et al. | 73/204.26 |
| 4,554,829 | 11/1985 | Sumal | 73/204.26 |
| 4,594,889 | 6/1986 | McCarthy | 73/204.26 |
| 4,776,214 | 10/1988 | Moran et al. | 73/202 |
| 4,783,996 | 11/1988 | Ohta et al. | 73/204.26 |
| 4,805,452 | 2/1989 | Eiermann et al. | 73/204.26 |
| 4,825,694 | 5/1989 | Weibler | 73/204.26 |
| 4,966,037 | 10/1990 | Sumner et al. | 73/204.26 |
| 5,027,652 | 7/1991 | Goebel et al. | 73/204.26 |

Primary Examiner—Herbert Goldstein
Attorney, Agent, or Firm—Antonelli, Terry, Stout & Kraus

[57] ABSTRACT

A thermal air flow meter having therein a thermo sensitive film resistor and a charging current control circuit for controlling a current supplied to the thermo sensitive film resistor both being formed on a commom substrate by the same process technology, and the thermo sensitive film resistor unit being disposed along a direction of flow of an air to be detected.

11 Claims, 5 Drawing Sheets

AIR FLOW RATE DETECTOR

This application is a Continuation application of Ser. No. 07/683,619, filed Apr.11,1991 now abandoned.

BACKGROUND OF THE INVENTION

1. Field Of The Invention

The present invention relates to an air flow rate detector and more particularly to an air flow rate detector used for fuel control of a motor vehicle engine utilizing a thermo sensitive film resistor.

2. Description Of The Prior Art

In a prior art air flow rate detector to which a thermo sensitive film resistor is applied, as described in the Japanese Patent Publication No. 1988/13419 and the U.S. Pat. No. 4,911,008, an air flow rate detector unit and a charging current control circuit unit are provided in a separate manner.

SUMMARY OF THE INVENTION

In the above-mentioned prior art, no consideration is taken into account with respect to the manufacturing cost, and there is no consideration with the lowering of detection accuracy due to sticking of the dust contained in an air to be detected.

It is therefore an object of the present invention to provide a highly reliable air flow rate detector that is used for fuel control of a motor vehicle engine and is low in manufacturing cost while maintaining a high accuracy, thereby to realize less fuel consumption and cleaning of exhaust gas.

The above-mentioned object is, according to the present invention, attained by the provision of an air flow rate detector characterized by forming a detection element and a control circuit therefor on a common substrate using the same process technology. Moreover, in order to attain higher reliability, the detection element is disposed in a direction in which the dust is difficult to stick thereto in terms of the relative positional relationship between the detection element and the direction of the air flow. In addition thereto, the detection element is provided in a bypass line for by-passing therethrough air to be detected.

A thermo sensitive film resistor serving as the air flow rate detection element, and the control circuit therefor are formed on a single common substrate by means of the same process technology as described above, and therefore, the manufacturing process becomes simple so that the air flow rate detector according to the present invention is very advantageous in cost.

Moreover, since the direction of formation of the thermo sensitive film resistor and that of flow of the air to be detected are the same, there is less amount of sticking of the dust, and further, since the thermo sensitive film resistor is provided in the bypass line used for passing the air to be detected, the amount of the dust contacting the thermo sensitive film resistor is sufficiently reduced.

Moreover, a substrate having a thermo sensitive film resistor formed thereon has a function of rectifying ,i.e.,smoothing or streamlining the air flow to be detected, and therefore, the output signal from the air flow rate detector is stabilized.

DESCRIPTION OF THE PREFERRED EMBODIMENTS

Preferred embodiments of the present invention will hereinafter be described with reference to the accompanying drawings.

Figure 1:
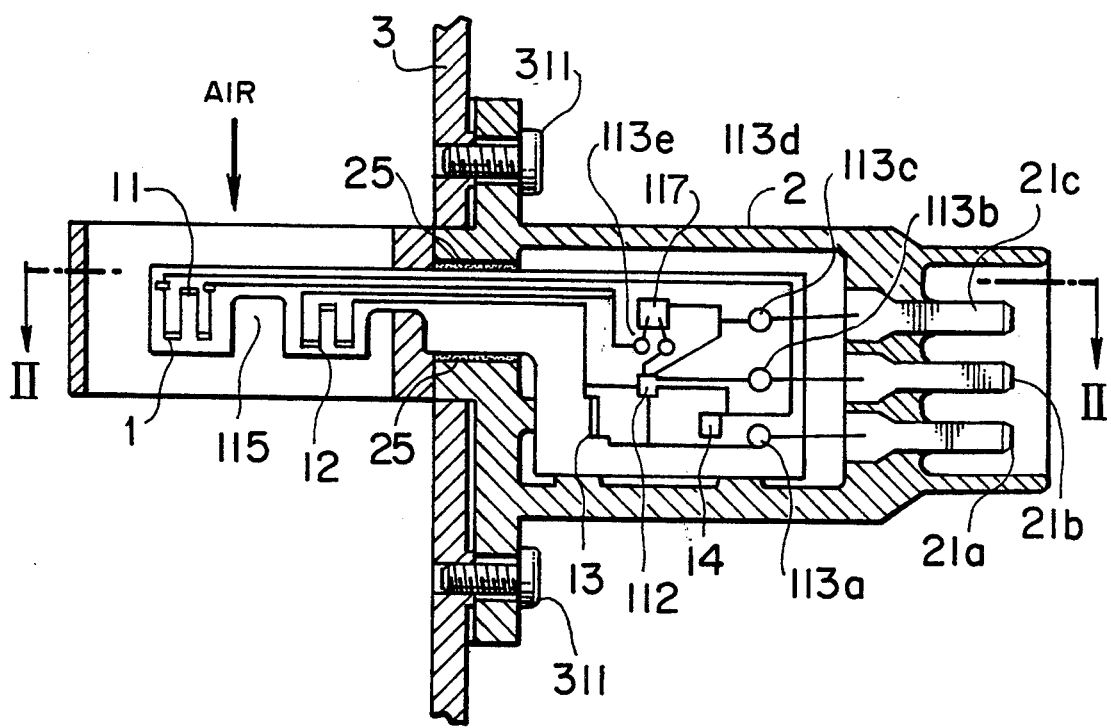
FIG. 1 is a cross sectional view showing an embodiment of an air flow rate detector according to the present invention.
Figure 2:
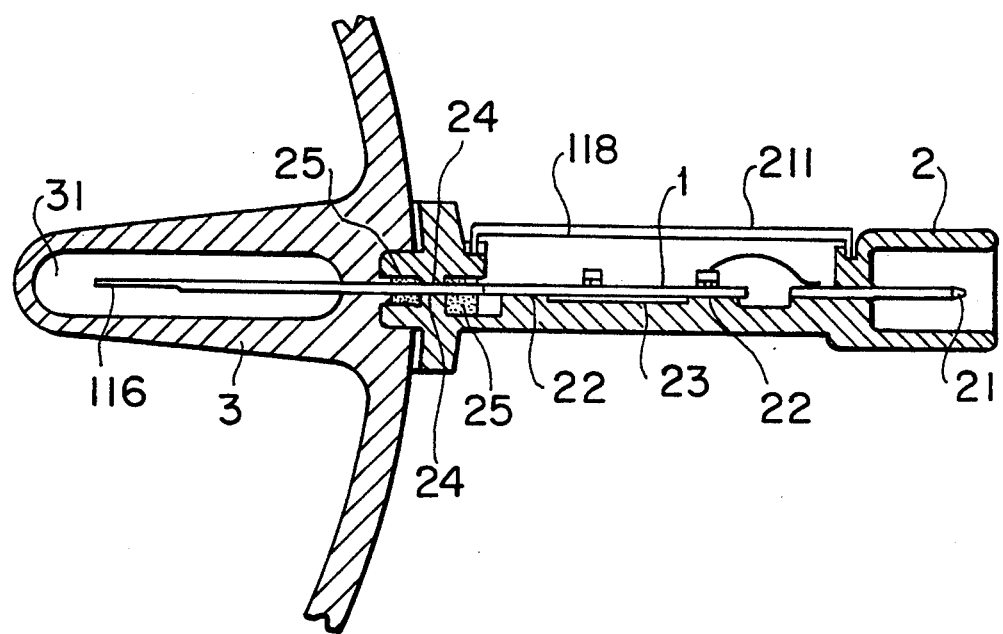
FIG. 2 is a cross sectional view taken on the line II—II of FIG. 1.
Figure 3:
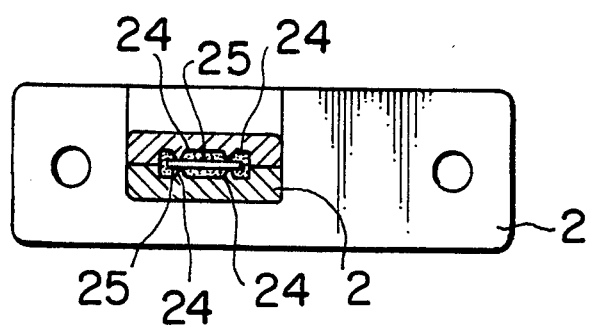
FIG. 3 is a detail side view showing a fixing portion of a holder and a substrate.

FIG. 1 is a cross sectional view showing the construction of an embodiment of an air flow rate detector according to the present invention, FIG. 2 is a cross sectional view taken on the line II—II of FIG. 1, and FIG. 3 is a plan view showing a fixing portion of a substrate and a holder.

First, the description will be given with respect to the construction of the air flow rate detector. In FIGS. 1 and 2, the reference numeral 1 designates an electrical insulating substrate made of a material such as ceramics, glass or the like. On the substrate 1, thermo sensitive resistors 11 and 12 made of a material such as platinum, resistors 13 and 14 and a conductor pattern, each of which constitutes an electronic circuit, are formed by either a thick film circuit manufacturing method utilizing a printing technique, or a thin film circuit manufacturing method utilizing sputtering. Subsequently, a transistor 117, an IC 112, and pads 113a through 113e used for connection are connected with solder, thus completing a circuit function. A holder 2 is a resin molding to which electrical connection terminals 21a through 21c used for connecting the air flow rate detector with the external side thereof are inserted.

The substrate 1 and the holder 2 are in contact with each other through a portion 22, and are bonded to each other with an adhesive on a portion 23. As shown in FIG. 3, an intermediate portion of the substrate between a thermo sensitive resistor unit and a circuit unit is held by a protruding portion 24 formed in the holder 2 and is bonded thereto by a foam adhesive 25 having a good heat insulating property (e.g., silicon resin) so as to prevent air leak.

The reference numeral 3 designates an air passage through which air to be detected flows, and the air passage 3 is partially provided with a bypass line 31. The holder portion is fixed to the air passage 3 by attaching screws 311 in such a way that a portion of the substrate 1 on which the above-mentioned thermo sensitive resistors 11 and 12 are formed is disposed in the bypass line 31.

Figure 4:
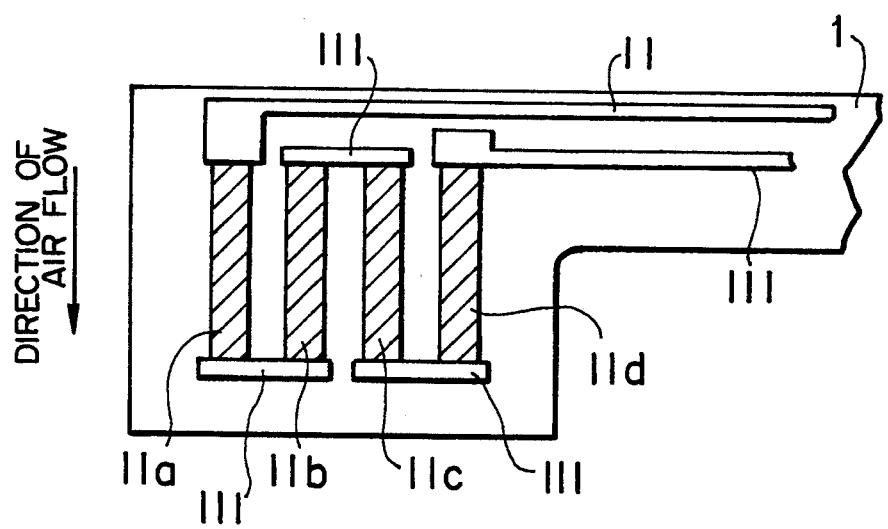
FIG. 4 is a detail plan view showing the arrangement of a thermo sensitive film resistor.
Figure 5:
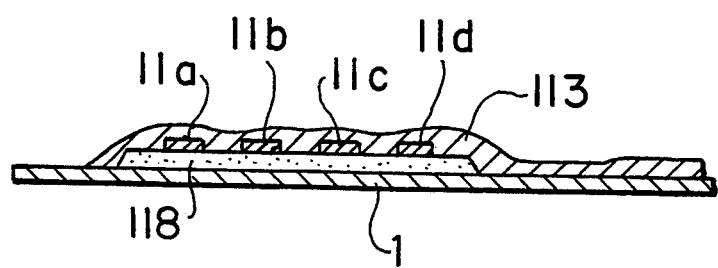
FIG. 5 is a detail cross sectional view showing the arrangement of the thermo sensitive film resistor shown in FIG. 4.

FIG. 4 is a detail plan view showing the arrangement of the thermo sensitive resistors 11 and 12, and FIG. 5 is a detail cross sectional view showing the arrangement thereof as shown in FIG. 4.

The thermo sensitive resistor 11 is formed in a manner as shown in FIG. 4. More specifically, resistor elements 11a through 11d are formed in the same direction as that of flow of the air to be detected, and the end portions of the associated ones are connected with each other by a conductor 111. In order to follow the change in an air flow rate at a high speed, it is required for the thermo sensitive resistor unit to have a small heat capacity and a function of reducing the heat conduction to the substrate. For this reason, as shown in FIGS. 1 and 2, the thermo sensitive resistor unit is provided with a portion 115 with a small cross section for increasing a heat resistance, and a portion 116 in which the substrate 1 is thinned to reduce the heat capacity. It is more effective for further reducing the heat conduction to the substrate 1 to provide an electrical insulating material 118 having a low thermal conductivity (e.g., glass) between the substrate 1 and the thermo sensitive resistor 11. The reference numeral 113 designates a protective coating material (e.g., glass) with which the circuit unit is also coated irrespective of the provision of the electrical insulating material 118.

Figure 6:
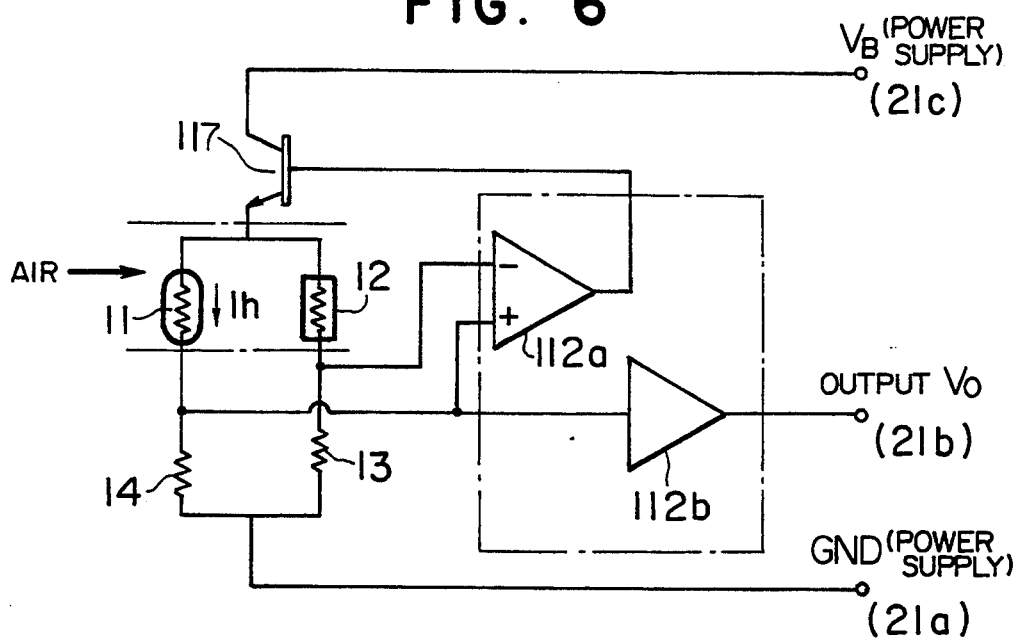
FIG. 6 is a circuit diagram showing an air flow rate detection circuit incorporating therein the air flow rate detector of the present invention.

The description will subsequently be given with respect to the operation of the air flow rate detector with reference to FIG. 6.

A bridge circuit is made up of the thermo sensitive resistors 11 and 12, and the resistors 13 and 14. The electric power supplied to the bridge circuit is controlled by a differential amplifier 112a provided in the IC 112 through the transistor 117 in such a way that the difference in voltage between the two midpoints of the bridge is set at a constant value (about 0 V). In this connection, the thermo sensitive resistors 11 and 12 are used for detecting the temperature of the air. Therefore, if the resistance values of the thermo sensitive resistors 11 and 12, and those of the resistors 13 and 14 are set respectively in a state in which one thermo sensitive resistor 11 is heated more than the temperature of the air while the other thermo sensitive resistor 12 is not being heated, it is possible to supply a heating current Ih so as to make the temperature of one thermo sensitive resistor 11 higher than that of the air by a predetermined value. Accordingly, the heating current Ih is expressed as a function of an air flow rate Q. Then, the heating current Ih is converted into a voltage through a resistor 14 and is subsequently amplified by the differential amplifier 112a within the IC 112, thus obtaining a voltage signal Vo to the external side.

Figure 7:
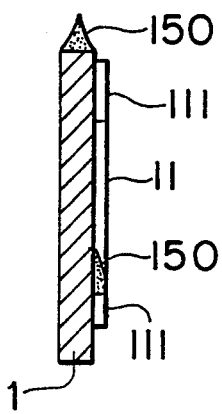
FIG. 7 is a cross sectional view showing the air flow rate detector in a state in which the dust sticks to the thermo sensitive resistor unit.

According to the embodiment as described above, the thermo sensitive resistors each serving as an air flow rate detection element, and the control circuit therefor can be formed on the single substrate 1 in the same process, and therefore, there is an advantage in that an unexpensive air flow rate detector can be provided. Moreover, the influence of sticking of the dust upon the reliability of the detector will be described with reference to FIG. 7. The dust contained in the air sticks to the upper side of the substrate 1 and the transverse wiring pattern perpendicular to the air flow as shown in FIG. 7. The dust sticking to the upper side of the substrate 1 does not influence directly upon the heat transfer. The dust sticking to the transverse wiring pattern will influence the heat transfer if than pattern constitutes a heating unit. In the case where that pattern constitutes the conductor as in the present embodiment, however, such an influence is substantially negligible.

Embodiments of the thermo sensitive resistor for attaining a higher accuracy will subsequently be described.

Figure 8:
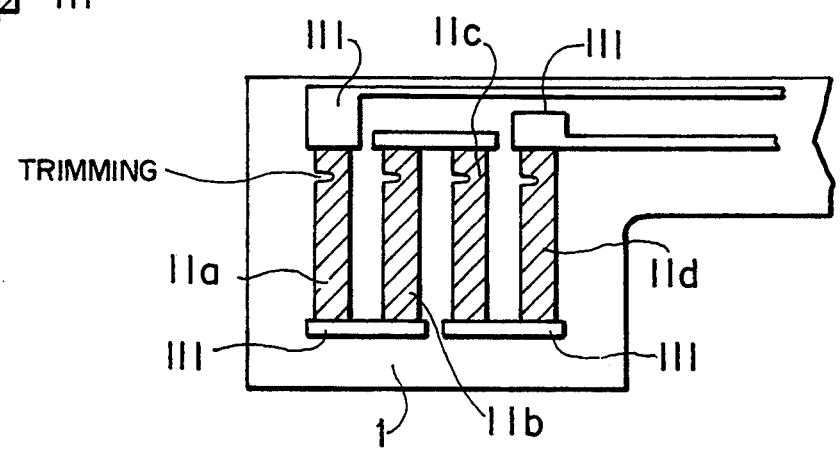
FIG. 8 is a plan view showing an embodiment of the thermo sensitive film resistor which is subjected to uniform trimming.

FIG. 8 is a plan view showing an embodiment of the thermo sensitive resistor in which the resistance values are made to be uniform. The heating temperature of the thermo sensitive resistor is affected by the variations in resistance value. In other words, it is an important matter for attaining a high accuracy to make the resistance values (in non-heating time) uniform, and therefore, the resistance trimming is carried out. In this connection, if the resistances of the resistor elements 11a through 11d are not uniformly trimmed, the unbalance in temperature among the resistor elements 11a through 11d occurs, thus varying the output of the air flow rate detector. Then, in the present embodiment, a resistance value Ra before the trimming is first measured, and a deviation (Rf−Ra) between a desired value Rf after the trimming and the resistance value Ra is then calculated. Thereafter, the deviation (Rf−Ra) is divided by the number of resistors N (N=4 in the present embodiment), and the resistance trimming is then carried out in the following manner. First, the resistor element 11a is trimmed up to (Rf−Ra)×1/N; and then the resistor element 11b is trimmed up to (Rf−Ra)×2/N. Thus, the uniform trimming can be carried out over the whole resistor.

According to the present embodiment, it is possible to obtain a highly accurate output of the detector in which a temperature distribution in the thermo sensitive resistor is stable while maintaining a fixed heating temperature.

Figure 9:
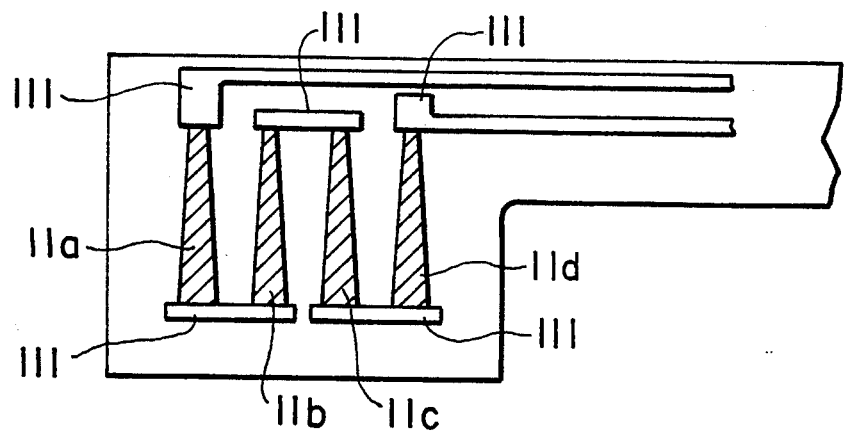
FIG. 9 is a plan view showing an embodiment of the thermo sensitive film resistor which is capable of providing a fixed thermal distribution.

FIG. 9 is a plan view showing an embodiment of the thermo sensitive resistor in which a thermal distribution in the thermo sensitive resistor is fixed. One method for attaining a highly accurate output of the air flow rate detector is to make the temperature of the heating unit uniform. Unifying the temperature distribution in a direction perpendicular to that of flow of the air is just described above. In the mean time, unifying the temperature distribution in a direction of flow of the air can be attained by changing the resistance distribution of the thermo sensitive resistor from a portion upstream of the air flow to a portion downstream thereof, as shown in FIG. 9. More specifically, since the heat transfer rate between the substrate 1 and the air is large on the upstream side and small on the downstream side, correspondingly, the resistance values of the thermo sensitive resistor elements 11a through 11d are made to be large on the upstream side, while those on the downstream side are made small, whereby the temperature distribution in a direction of the air flow is made to be uniform. This allows a highly accurate air flow rate output to be obtained.

Figure 10:
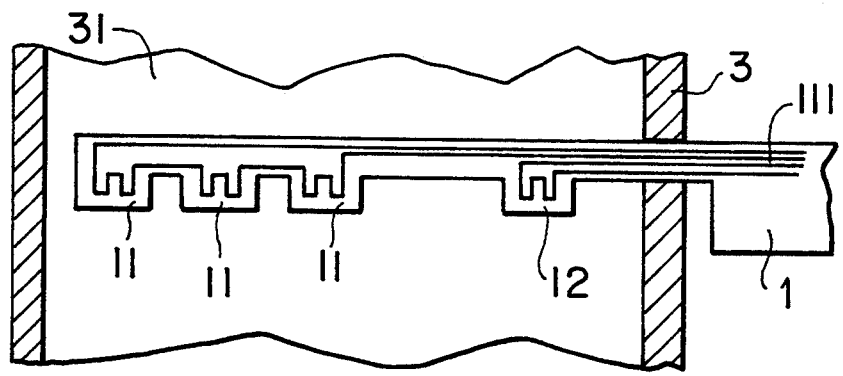
FIG. 10 is a plan view showing an embodiment of a multipoint detection type air flow rate detector according to the present invention.

FIG. 10 is a plan view showing an embodiment of a multipoint detection type air flow rate detector. In the air flowing through the air passage 3, a channeling is generally generated due to the shape of the air passage and the like. Therefore, by detecting the air flow at the multipoint, the influence of the channeling upon the detection is effectively reduced. In FIG. 10, the thermo sensitive resistors 11 are disposed in series at three points.

By adopting such an arrangement, as described above, it is possible to obtain a highly accurate air flow rate detector.

Figure 11:
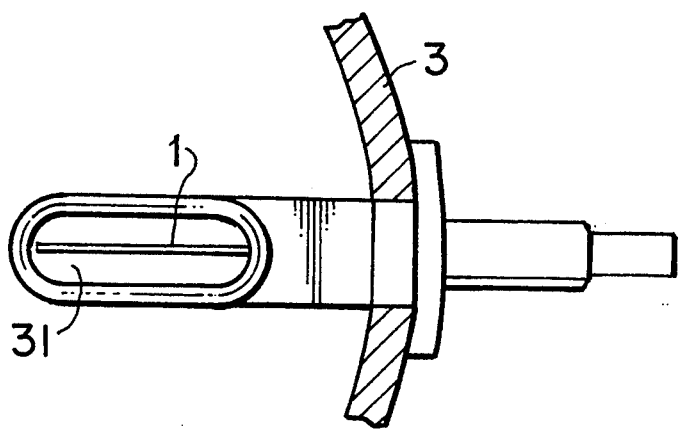
FIGS. 11 through 13 are respectively a partially plan view, a sectional side elevation view, and a partially bottom plan view showing the main portions of an embodiment of the air flow rate detector provided integrally with a bypass line.
Figure 12:
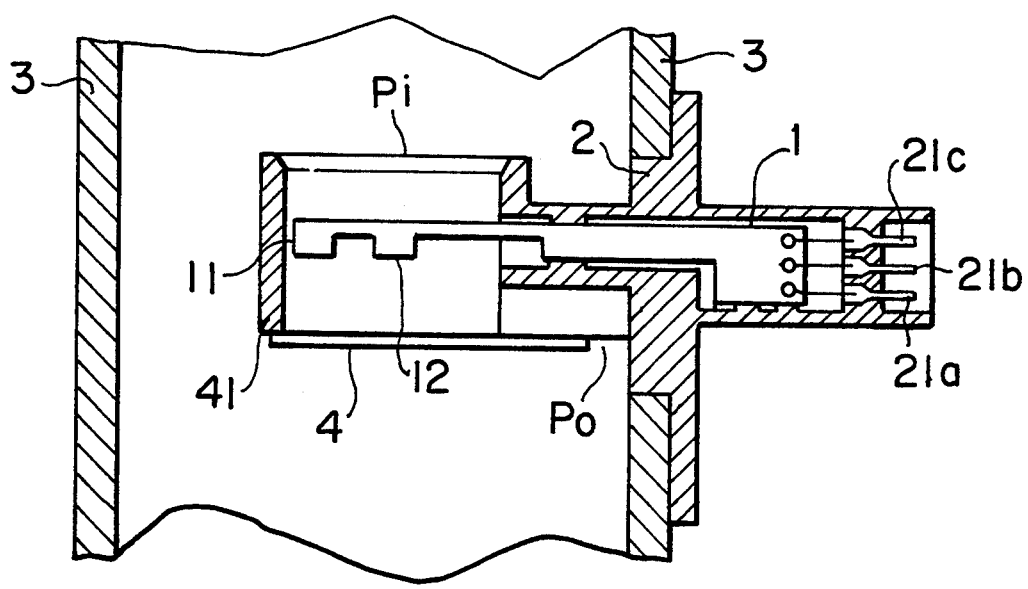
Figure 13:
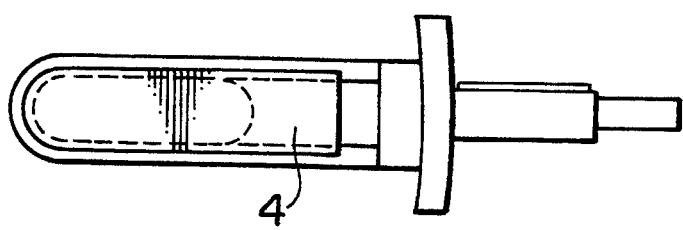

A description will subsequently be given with respect to an embodiment in which the bypass line of the air passage is provided integrally with the holder 2. FIG. 11 is a partial bottom plan view of the embodiment, FIG. 12 is a sectional side elevation view thereof, and FIG. 13 is a partial bottom plane view thereof. The bypass line 31 is formed by shaping the holder 2 and a resin into an integral one-piece. In the bypass line 31 thus formed is disposed the thermo sensitive resistors 11 and 12. In FIG. 12, the reference numeral 4 designates a plate which is bonded with an adhesive 41 from the lower side when viewed from the figure. In this construction, the air to be detected enters the bypass line 31 through an inlet Pi, passes the thermo sensitive resistors 11 and 12, and flows into the main passage again through an outlet Po.

According to the present embodiment, the flow velocity of the air flowing through the bypass line 31 is smaller than that of the main passage. Therefore, the amount of dust which passes the thermo sensitive resistors becomes necessarily small, and as a result, there is an advantage in that a change in the output of the air flow rate detector due to sticking of the dust is sufficiently controlled.

Figure 14:
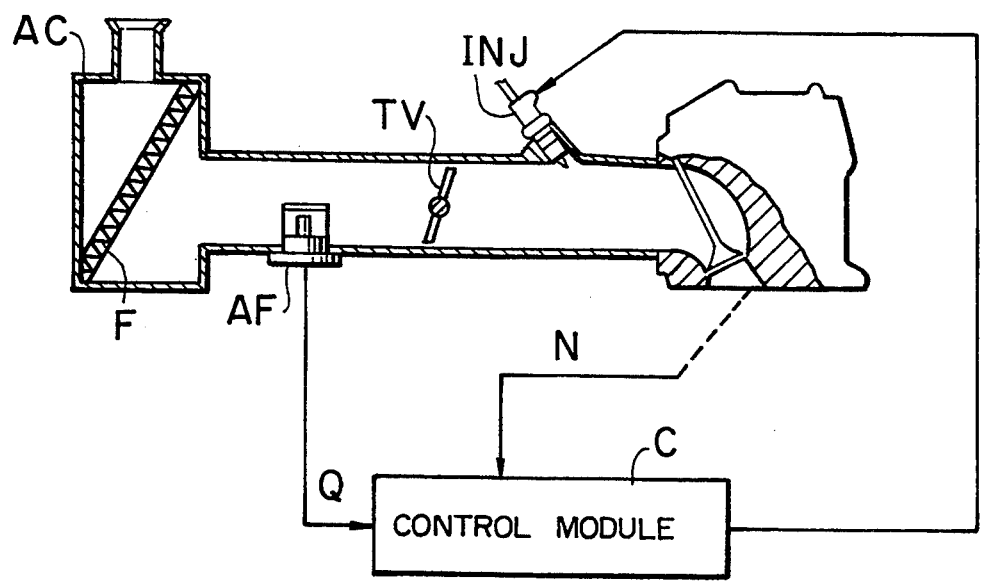
FIG. 14 is a cross sectional view showing an embodiment of an engine control system incorporating therein the air flow rate detector of the present invention.

FIG. 14 is a cross sectional view showing an embodiment of an engine control system to which one of the above-mentioned embodiments of the air flow rate detector is applied. First, the construction of the engine control system will be described. The reference symbol AC designates an air cleaner which serves to take in the sucked air used for an engine, and has therein an air filter F. The reference symbol AF designates the above-mentioned air flow rate detector which is mounted in a passage including therein a throttle valve TV. The reference symbol INJ designates an injector which serves to directly supply fuel to the engine, and the reference symbol C designates a control module which serves to receive an output Q from the air flow rate detector AF and an engine speed N of the engine (not shown) as its inputs, to calculate the amount of fuel supplied to the engine by a microcomputer, and to give an instruction with respect to the resultant fuel supply amount to the injector INJ.

According to the present embodiment, since the output of the air flow rate detector AF has a high detection accuracy, it is possible to obtain a highly accurate engine control system (being capable of realizing less fuel consumption and a lean supply of exhaust gas).

FIG. 14 shows an example in which the engine in the form of a multiple cylinder engine is controlled by the single air flow rate detector AF. As already shown in FIGS. 11 through 13, however, since the flow rate detector according to the present invention can be miniaturized, it can be mounted to an intake manifold of every engine cylinder, and a motor vehicle in which less fuel consumption and cleaning of exhaust gas are attained can be realized.

As set forth hereinabove, according to the present invention, a highly reliable air flow rate detector can be realized which is inexpensive, provides excellent performance in the detection accuracy of the air flow rate, and has no change in the detection accuracy due to sticking of the dust contained in the air.

What is claimed is:

1. An air flow rate detector for detecting rate of flow of air in an air passage, said air flow rate detector comprising:

a thermosensitive film resistor having a resistance value which varies with temperature;

a control circuit for controlling current flowing through said thermosensitive film resistor;

a substrate having said thermosensitive film resistor and said control circuit formed thereon;

a holder member for positioning said substrate with said thermosensitive film resistor in the air passage and said control circuit outside the air passage; and a foam adhesive having high thermal insulating properties bonding a portion of said substrate, intermediate said thermosensitive film resistor and said control circuit, to said holder member, while preventing passage of air from a space adjacent said control circuit to a space adjacent said thermosensitive film resistor;

said thermosensitive film resistor comprising at least one longitudinal electrical resistance element, including a first portion and a second portion and being adapted to be positioned in the air flow passage with said longitudinal resistor element extending longitudinally in the air flow direction and said first portion adapted to be positioned upstream in the air flow direction from said second portion, said longitudinal resistor element having smoothly increasing resistivity with said first portion having a greater resistivity than said second portion, whereby the temperature distribution in the direction of air flow is substantially uniform.

2. An air flow rate detector for detector as claimed in claim 1, further comprising a glass coating over said thermosensitive film resistor and said control circuit.

3. An air flow rate detector as claimed in claim 1, wherein said substrate comprises a rectifying plate formed of an electrical insulating material for rectifying air flowing through the air passage.

4. An air flow rate detector as claimed in claim 1, further comprising a heat insulating material formed between said substrate and said thermosensitive film resistor.

5. An air flow rate detector as claimed in claim 1, wherein said thermosensitive film resistor first portion is more narrow in width than said thermosensitive film resistor second portion.

6. An air flow rate detector as claimed in claim 1, wherein a portion of said substrate between said positioning means and a formation portion of said thermosensitive film resistor is non-uniform in cross sectional area.

7. An air flow rate detector as claimed in claim 1, wherein said thermosensitive film resistor includes at least two thermosensitive film resistor elements.

8. An air flow rate detector as claimed in claim 7, wherein said thermosensitive resistor elements have negligible variation in length and width and compensating variations in thickness, thereby providing an air flow rate detector having known uniform quality and performance characteristics.

9. An air flow rate detector as claimed in claim 1, wherein:

said thermosensitive film resistor includes a first resistor element connected to be heated above ambient air temperature in the air passage, a second resistor element for measuring the ambient air temperature in the passage, a third resistor element, a fourth resistor element, and means forming a bridge circuit including said first resistor element, said second resistor element, said third resistor element, and said fourth resistor element;

said third resistor element and said fourth resistor element are on said substrate, and said positioning means positions said third resistor element and said fourth resistor element outside the air passage.

10. An air flow rate detector as claimed in claim 1, wherein said thermosensitive resistor element has a uniform resistivity per unit cross-sectional area over its length.

11. An air flow rate detector for detecting rate of flow of air in an air passage, said air flow rate detector comprising:

a thermosensitive film resistor having a resistance value which varies with temperature;

a control circuit for controlling current flowing through said thermosensitive film resistor;

a substrate having said thermosensitive film resistor and said control circuit formed thereon; and a holder member for positioning said substrate with said thermosensitive film resistor in the air passage and said control circuit outside the air passage;

said thermosensitive film resistor comprising at least one longitudinal electrical resistance element, including a first portion and a second portion and being adapted to be positioned in the air flow passage with said longitudinal resistor element extending longitudinally in the air flow direction and said first portion adapted to be positioned upstream in the air flow direction from said second portion, said longitudinal resistor element having smoothly increasing resistivity, with said first portion having a greater resistivity than said second portion, whereby the temperature distribution in the direction of air flow is substantially uniform.

* * * * *